United States Patent [19]
Humphreys

[11] Patent Number: 5,338,562
[45] Date of Patent: Aug. 16, 1994

[54] LOW FAT SPREAD AND PROCESS FOR MAKING SAME

[75] Inventor: William M. Humphreys, Ishoej, Denmark

[73] Assignee: FMC Corporation, Philadelphia, Pa.

[21] Appl. No.: 981,649

[22] Filed: Nov. 25, 1992

[51] Int. Cl.$^5$ .............................................. A23D 9/04
[52] U.S. Cl. ..................................... 426/603; 426/804
[58] Field of Search ................ 426/603, 578, 573, 804

[56] References Cited

U.S. PATENT DOCUMENTS

| | | | |
|---|---|---|---|
| 4,273,790 | 6/1981 | Bosco et al. | 426/335 |
| 4,292,333 | 9/1981 | Bosco et al. | 426/335 |
| 4,859,484 | 8/1989 | Bielskis et al. | 426/573 |
| 4,990,355 | 2/1991 | Gupta | 426/804 |
| 5,192,569 | 3/1993 | McGinley | 426/804 |

FOREIGN PATENT DOCUMENTS

0420314A3 11/1990 European Pat. Off. .

OTHER PUBLICATIONS

"Low Fat Margarine", Research Disclosure, Apr. 1992, No. 336, pp. 241–242.

*Primary Examiner*—Carolyn Paden
*Attorney, Agent, or Firm*—Anthony L. Cupoli; Mark A. Greenfield; Robert L. Anderson

[57] ABSTRACT

A low fat spread, being a water-in-oil emulsion, having a fat substitute which has a particle size in the range of 8–35 microns. A low fat spread having a unique combination of stabilizer, emulsifier, and fat substitute to provide less than 28% fat, and the method for making the low fat spread.

31 Claims, No Drawings

LOW FAT SPREAD AND PROCESS FOR MAKING SAME

FIELD OF THE INVENTION

The invention is in the field of low fat spreads. More particularly, the invention is in the field of low fat spreads having no more than 28% fat.

BACKGROUND

Margarine and other oleaginous spreads have a fat content which may be as high as 83%. A number of lower fat spreads have been made available. Low fat spreads having 40% fat or less are available; however, it is unusual to have a low fat spread with less than 30% fat content.

U.S. Pat. No. 4,292,333 entitled, "Low Fat, Butter-Flavored Liquid Spread and Process" discloses an oil-in-water emulsion having less than 30% of a dispersed fat, a continuous aqueous phase containing an emulsion stabilizer, and an emulsifier system comprising a lipophilic emulsifier and a hydrophilic emulsifier. This patent teaches that water-soluble emulsion stabilizers are essential. It moreover teaches that suitable stabilizers include microcrystalline cellulose, carrageenan, guar gum, alginate, and xanthan gum.

U.S. Pat. No. 4,292,333 also teaches the use of a dual emulsifier composition having a lipophilic emulsifier and a hydrophilic emulsifier. The emulsifiers can be fatty acid glycerides.

European Patent Application No. 90202415 (900911)teaches a spread having less than 30% fat and at least 70% aqueous phase. The spread includes a mixture of monoglycerides and polyglycerol esters, microcrystalline cellulose as a gelling agent, and from 15-28% fat phase.

"Low Fat Margarine," submitted by FMC Corporation, and published in, "Research Disclosure", in April of 1992 disclosed the following formulation for a low fat margarine:

|  | w/w |
|---|---|
| Fat Phase: | |
| Ordinary sunflower oil (Beoco Ltd) | 18.650 |
| Hardened soya oil (Beoco Ltd) | 11.600 |
| Palm oil (Beoco Ltd) | 9.200 |
| Emulsifier - Dimodan CP monoglyceride | 0.500 |
| Flavor - butter flavoring 58.T.333 (Edlong Co.) | 0.050 |
| Aqueous Phase: | |
| Water | 58.169 |
| Stabilizer - Avicel ® RC-591 cellulose gel | 0.800 |
| Salt (British Salt Ltd) | 0.500 |
| Potassium sorbate (Dinova Chemicals) | 0.200 |
| Xanthan - Keltrol RD (Kelco International) | 0.080 |
| Lactic acid - 80% (Dinoval Chemicals) | 0.025 |
| Color - Beta carotene (5% suspension) (Roche Products Ltd) | 0.006 |

Reducing the fat content of a spread from 80% to no more than 28% is not a simple matter. With no more than 28% fat, the spread is primarily composed of water. To maintain the spread as a water-in-oil emulsion is not particularly easy under these circumstances. Moreover, having removed so much of the fat, a great deal of thought and effort must be given to mimicking the functional and organoleptic properties of the fat that has been replaced.

There are numerous properties which must be addressed and manipulated in order to achieve a product having satisfactory functional and organoleptic properties. The low fat spread must offer the same quality and taste as the full-fat system. In addition, mimicking the characteristics of a full-fat system requires control over viscosity (thickness, smoothness), and absorption/adsorption (physiological effect on tastebuds), cohesiveness, waxiness and mouth coating ability.

SUMMARY OF THE INVENTION

The invention includes a low fat spread having no more than 28% fat. The spread is a water-in-oil emulsion which includes a dispersed water phase having at least 56% water, a fat substitute having a mean particle size within a range of 8-35 microns, an effective amount of stabilizer for the fat substitute, a gum, and a continuous oil phase which includes no more than 28% oil, together with an effective amount of emulsifier suitable for forming and maintaining a stable water-in-oil emulsion when the dispersed phase and continuous phase are mixed.

Generally, a spread of this invention will have from 10-28% fat. Preferably, a spread of this invention will have from 15-25% fat. More preferably, the spread will have from 20-25% fat.

A suitable stabilizer such as colloidal microcrystalline cellulose is utilized. Generally the mean particle size of the stabilizer will be within the range of 0.05-0.5 microns. More preferred is a stabilizer having a mean particle size within the range of 0.1-0.6 microns.

An effective amount of stabilizer should be used. From 0.5-4 wt/% stabilizer is preferred; 0.9-2.2 wt/% stabilizer is more preferred. Using the guidelines presented herein an effective amount of stabilizer can be determined without undue experimentation.

A fat substitute having a mean particle size within the range of from 8-35 microns is generally desired, although larger or smaller mean particle size fat substitutes are acceptable. More preferred is a fat substitute having a mean particle size within the range of 12-28 microns and most preferably the mean particle size of the fat substitute will be in the range of 16-24 microns.

Suitable emulsifiers include the fatty acid esters formed from $C_8$-$C_{18}$ fatty acids and mono-, di-, or polyglycerols. Typically, they, or mixtures of them, will have an HLB within the range of from 3 to 7.

The products of this invention may be formed by mixing in a suitable manner.

DESCRIPTION OF THE PREFERRED EMBODIMENTS

Other than in the operating examples, or where otherwise indicated all numbers expressing quantities of ingredients, parameters, or reaction conditions used herein are to be understood as modified in all instances by the term "about."

The invention includes a water-in-oil emulsion which is suitable for use as a low fat spread. It is preferred that the spread be spreadable yet remain firm at temperatures within the range of from 5° C. (41° F.) to 22° C. (71.6° F.).

Unless otherwise stated, all percentages described herein are percentages by weight based on the total emulsion weight achieved when the dispersed phase and aqueous phase are admixed.

EXAMPLE 1

A low fat margarine having the composition described in Table 1 was prepared as described below.

Aqueous Phase Preparation

In preparing the low fat spreads of this invention, the following method was used. The stabilizer was dispersed in water at high shear. Xanthan gum was then added and incorporated by mixing at continued high shear. A fat substitute was then added and incorporated with further high shear mixing.

Other water-soluble ingredients known to those skilled in the art were added, as desired. The aqueous phase was then chilled to approximately 42° C. (107.6° F.).

Fat Phase Preparation

The component fats were mixed and heated to 60° C. (140° F.) for approximately 20 minutes.

About 15% of the fats were removed from the mixture and heated to about 80° C. (176° F.) and the emulsifiers were incorporated by mixing. This mixture was then added back to the bulk of the fat phase and the fat soluble flavors and other fat soluble ingredients were then added.

The fat phase was then cooled to emulsification temperature.

Emulsification and Crystallization

The aqueous phase was added to the lipid phase gradually under controlled mixing in order to obtain a uniform crude water-in-oil emulsion without any air incorporation or emulsion inversion.

The emulsion was prepared at approximately 40° C. (104° F.) and passed through a chilling unit for crystallization and product finishing.

Table 1 is a 25% fat containing low fat spread. The spread was prepared having the following components on a percent by weight basis.

TABLE 1

25% Fat Spread

| AQUEOUS PHASE | | LIPID PHASE | |
|---|---|---|---|
| INGREDIENT | % | INGREDIENT | % |
| colloidal microcrystalline cellulose stabilizer | 1.9 | Sunflower oil | 11.5 |
| Xanthan | 0.19 | Hydrogenated Soya oil | 7.15 |
| fat substitute: Novagel* ® RCN-15 microcrystalline cellulose | 1.5 | Palm oil | 5.65 |
| NaCl | 1.8 | Dimodan OT | 0.35 |
| 10 DE Maltodextrin | 5.0 | Triodan R-90 | 0.25 |
| Potassium Sorbate | 0.2 | Edlong Butter Flavour-58T333 | 0.06 |
| 5% beta-carotene | 0.025 | Grindox 104 | 0.035 |
| Annatto 300 | 0.0075 | Vitamin Premix-Z/027 | 0.005 |
| Water | to 100 | | |

*Novagel ® RCN-15 microcrystalline cellulose is a trademark of the FMC Corporation.

EXAMPLE 2

A 20% fat spread was produced using the method described in Example 1. That spread had the following composition:

TABLE 2

20% Fat Spread

| AQUEOUS PHASE | | LIPID PHASE | |
|---|---|---|---|
| INGREDIENT | % | INGREDIENT | % |
| colloidal microcrystalline cellulose stabilizer | 2.2 | Sunflower oil | 9.06 |
| Xanthan | 0.22 | Hydrogenated Soya oil | 5.64 |
| fat substitute: microcrystalline cellulose/ galactomannan 20 micron mean particle size | 1.6 | Palm oil | 4.455 |
| Maltodextrin (10 DE) | 5.0 | Dimodan OT | 0.35 |
| Salt-NaCl | 1.8 | Triodan R-90 | 0.4 |
| Potassium Sorbate | 0.2 | Grindox 104 | 0.03 |
| 5% beta-carotene | 0.025 | Vitamin Premix-Z/027 | 0.005 |
| Annatto 300 | 0.01 | Edlong Butter Flavour-58T333 | 0.06 |
| Water | to 100 | | |

Having described the method for preparing low fat spreads of this invention together with describing examples of low fat spreads that have been produced, a fuller explication of the ingredients is provided below.

STABILIZERS

Colloidal stabilizers are preferred. A particularly preferred stabilizer is AVICEL ® 591 F., microcrystalline cellulose. AVICEL ® 591F is a registered trademark of FMC Corporation for a microcrystalline cellulose. AVICEL ® 591F microcrystalline cellulose is a coprocessed carboxymethyl cellulose and microcrystalline cellulose. The microcrystalline cellulose imparts thioxotropic properties to the low fat spread helping to impart a mouthfeel similar to that of fat.

Other stabilizers known to those skilled in the art can be used. Those include carrageenan, guar gum, xanthan gum, soy protein isolate, methyl cellulose, carboxymethyl cellulose, ethyl cellulose, hydroxypropylethyl cellulose, dextrans, starch, gelatin, locust bean gum, pectin, and the like and mixtures of these.

GUMS

Gums are provided to give structure to the low fat spread. A preferred gum is xanthan gum. Other gums known to those skilled in the art can be substituted. Those gums include carrageenan, guar gum, locust bean gum and pectin. Gums can represent from 0.1 to 2.0 wt % of the emulsion. Preferably, the spread will include gum within the range of 0.1 to 0.5 wt %, and more preferably the gum will be present within the range of from 0.15 to 0.4 wt %.

FAT SUBSTITUTES

Microcrystalline cellulose, especially microcrystalline cellulose coprocessed with galactomannan, having a mean particle size greater than 8 microns is suitable as a fat substitute. Generally, microcrystalline cellulose having a mean particle size within the range of 8–35 microns is preferred, microcrystalline cellulose particles having a mean particle size in the range of 16–24 microns are more preferred. A microcrystalline cellulose having a mean particle size within the range of 18–22 microns is most preferred.

NOVAGEL ® RCN-15, microcrystalline cellulose or NOVAGEL ® RCN-10, microcrystalline cellulose is suitable. NOVAGEL ® RCN-15 and NOVA- GEL ® RCN-10 are trademarks of FMC Corporation for microcrystalline cellulose coprocessed with one or more galactomannans, preferably guar. These have a mean particle size of 20 microns. These coprocessed galactomannans are taught in U.S. patent application Ser. No. 809,857 filed Dec. 18, 1991 which is a continuation of U.S. patent application Ser. No. 519,693 filed May 7, 1992 which is a counterpart of European Patent 90908745.4. U.S. patent application Ser. No. 809,857 filed Dec. 18, 1991 is incorporated herein by reference. The microcrystalline cellulose fat substitute may be present in the spread within the range of from 0.01 to 10 wt %. More preferably it will be within the range of from 0.05 to 5 wt % and most preferably it will be present within the range of from 0.8 to 2.5 wt %.

EMULSIFIERS

Emulsifiers which are fatty acid esters formed from $C_8$–$C_{18}$ fatty acids and mono-, di-, or polyglycerols have been found to be effective. In particular, a mixture of TRIODAN ® R 90 polyglycerol ester of interesterified ricinoleic acid and DIMODAN ® OT distilled monoglyceride made from edible, partially hydrogenated soya bean oil is suitable. DIMODAN ® OT and TRIODAN ® R 90 are registered trademarks of Grinsted Products, DK-8220 Brabrand, Denmark. The estimated HLB of Triodan ® R 90 is 7.0 and the estimated HLB of Dimodan ® OT is 4.3.

The emulsifier concentrations, and if more than on used, the emulsifier ratios are chosen to create a stable water-in-oil emulsion. Effective emulsifier levels prevent inversion of the emulsion and prevent expression of water from the emulsion under normal use conditions. Effective concentrations of emulsifier are generally within the 0.1 to 2% range. Preferably the emulsifier concentration will be within the range of 0.4 to 1.0%. When combinations of two or more emulsifiers are used it is preferred that one be a monoglyceride and the other be a polyglycerol ester of a fatty acid. Generally a weight ratio of monoglyceride to polyglycerol ester within the range of 5:1 to 1:5 is usable. A ratio of 3:2 to 2:5 is preferred and a ratio of 3:2 to 2:4 is most preferred. There preferably should be no expression of water form the spread under its normal temperature utilization range of from 5° C. to 5° C.

The emulsifiers such as the above described fatty acid esters which have been found to be suitable have an HLB within the range of from 3 to 7. Emulsifiers having an HLB within the range of 4 to 6 are more preferred. For emulsifier mixtures, the effective HLB of the emulsifier mixture will be within these ranges; it is not necessary, in this case, that the HLB of the components be within the described range. Given these guidelines, those of ordinary skill in the art can select suitable emulsifier concentrations as well as suitable emulsifiers or suitable combinations of emulsifiers without undue experimentation.

WATER

For the examples described herein, deionized water was utilized.

OILS

Any oils which are typically incorporated in low fat spreads may be utilized. In particular, sunflower oil, hydrogenated soya oil, and palm oil are desired. However, utilization of other oils including milkfats can be achieved by one of ordinary skill in the art without undue experimentation.

I claim:
1. A spread comprising:
a low fat spread that is a water-in-oil emulsion having as ingredients in the following properties:
at least 56% water, as a disperse phase,
0.01–10 % of a microcrystalline cellulose/galactomannan coprocessed fat substitute having a mean particle size within the range of 8–35 microns,
an effective amount of stabilizer for the fat substitute,
0.1 to 2.0 % of a gum suitable for structuring the emulsion,
a continuous phase comprising no more than 28 weight percent oil, and
an effective amount of emulsifier suitable for maintaining a stable water-in-oil emulsion,
with all percentages being weight percentages being based on the total emulsion weight, and with the cumulative percentages of the ingredients being 100%.
2. The low fat spread of claim 1, wherein the emulsion contains 15 to 25 percent oil, at least 67% water, from 0.5 to 4 percent stabilizer and at least 0.1 percent gum.
3. The low fat spread of claim 1, wherein the stabilizer is microcrystalline cellulose having a mean particle size within the range of 0.05 to 0.5 microns.
4. The low fat spread of claim 3, wherein the gum is xanthan; wherein the emulsifier is a fatty acid ester having a $C_8$ to $C_{18}$ fatty acid component and a glycerol component selected from the group consisting of glycerol, diglycerol, and polyglycerol.
5. The low fat spread of claim 4, wherein the emulsifier is a mixture of fatty acid esters.
6. The low fat spread of claim 5, wherein the mixture of fatty acid esters includes a monoglyceride of a $C_8$ to $C_{18}$ fatty acid, and a polyglycerol ester of a $C_8$ to $C_{18}$ fatty acid.
7. The low fat spread of claim 6, wherein the fatty acid is a $C_{12}$ to $C_{18}$ fatty acid.
8. The low fat spread of claim 7, wherein the fatty acid is a $C_{14}$ to $C_{18}$ fatty acid.
9. The low fat spread of claim 4, wherein the fat substitute has a mean particle size within the range of from 16 to 24 microns, and a weight percent within the range of 0.5 to 2.5.
10. The low fat spread of claim 9, wherein the fat substitute is a coprocessed microcrystalline cellulose/galactomannan.
11. The low fat spread of claim 10, wherein the microcrystalline fat substitute has a mean particle size within the 18–22 micron range.
12. The low fat spread of claim 11, wherein the microcrystalline cellulose stabilizer has a mean particle size within the range of 0.1 to 0.6 microns.
13. The low fat spread of claim 11, wherein the emulsifier has an HLB within the range of 3 to 7.
14. The low fat spread of claim 11, wherein the emulsifier has an HLB within the range 4 to 6.
15. The low fat spread of claim 1, wherein the fat substitute is a coprocessed microcrystalline cellulose/guar.
16. A process for preparing a food which comprises: preparing a low fat spread that is a water-in-oil emulsion having from 15–28 wt % fat by admixing
a) an aqueous mixture with b) an oil mixture gradually with controlled mixing in order to obtain a uniform water-in-oil emulsion without air incorporation or emulsion inversion;

c) wherein the aqueous mixture is prepared by combining water in an amount of at least 56% based on the emulsion weight;

a microcrystalline cellulose/galactomannan fat substitute in an amount of 0.01% to 10% based on the emulsion weight and having a mean particle size within the range of 8–35 microns, a stabilizer in an effective amount for the microcrystalline cellulose/galactomannan fat substitute; and a gum in an amount of 0.1 to 2% based on the weight of the emulsion, which gum is suitable for structuring the emulsion, and applying high shear mixing to this aqueous mixture as it is being formed; and d) wherein the oil mixture is prepared by forming a mixture of an oil in an amount of 15–28% based on the weight of the water-in-oil emulsion, and a suitable emulsifier in sufficient quantity to form and maintain a stable emulsion when the aqueous mixture and the oil mixture are admixed.

17. The process of claim 16, wherein the fat substitute is microcrystalline cellulose which has been coprocessed with guar.

18. The process of claim 16, wherein the stabilizer is a microcrystalline cellulose having a mean particle size within the range of from 0.05 to 0.5 microns.

19. The process of claim 18, wherein the emulsifier is a fatty acid ester.

20. The process of claim 19, wherein the fatty acid ester is a glycerol ester having a $C_8$ to $C_{18}$ fatty acid component and a glycerol component selected from the group consisting of glycerol, diglycerol, and polyglycerol.

21. The process of claim 20, wherein the emulsifier is a mixture of fatty acid ester having a $C_8$ to $C_{18}$ fatty acid component and a glycerol component selected from the group consisting of glycerol, diglycerol and polyglycerol.

22. The process of claim 21, wherein the fat substitute has a mean particle size within the range of from 12–25 microns.

23. The process of claim 22, wherein the emulsifier mixture includes a monoglyceride of a $C_8$ to $C_{18}$ fatty acid, and a polyglyceride of a $C_8$ to $C_{18}$ fatty acid.

24. The process of claim 22, wherein the emulsifier mixture includes a monoglyceride of a $C_{12}$ to $C_{18}$ fatty acid, and a polyglyceride of a $C_{12}$ to $C_{18}$ fatty acid.

25. The process of claim 24, wherein the fat substitute has a mean particle size within the range of 16–24 microns.

26. The process of claim 25, wherein the emulsifier mixture includes a monoglyceride of a $C_{14}$ to $C_{18}$ fatty acid, and a polyglyceride of a $C_{14}$ to $C_{18}$ fatty acid.

27. The process of claim 26, wherein the low fat water-in-oil emulsion spread contains 0.5 to 4 wt % stabilizer, 0.5 to 2.5 wt % microcrystalline cellulose fat substitute, 0.3 to 2 wt % emulsifier, and the spread is firm at 5° C. but spreadable at temperatures above 22° C.

28. The process of claim 27, wherein the oil is selected from the group consisting of sunflower oil, soya oil, and palm oil.

29. The process of claim 26, wherein the low fat water-in-oil emulsion spread contains 0.5 to 4 wt % stabilizer, 0.5 to 2.5 wt % microcrystalline cellulose fat substitute, 0.4 to 1.0 wt % emulsifier, and the spreadable spread is firm at temperatures within the range of 5° C. to 22° C.

30. The process of claim 29, wherein the oil is selected from the group consisting of sunflower oil, soya oil, and palm oil.

31. The process of claim 16, wherein the emulsifier has a HLB within the range of 3 to 7.

* * * * *

UNITED STATES PATENT AND TRADEMARK OFFICE
CERTIFICATE OF CORRECTION

PATENT NO. : 5,338,562
DATED : Aug. 16, 1994
INVENTOR(S) : William M. Humphreys

It is certified that error appears in the above-indentified patent and that said Letters Patent is hereby corrected as shown below:

Column 5, line 46 reading "utilization range of from 5°C to 5°C." should appear as follows: utilization range of from 5°C to 35°C.

Signed and Sealed this

Thirteenth Day of August, 1996

Attest:

BRUCE LEHMAN

Attesting Officer    Commissioner of Patents and Trademarks